United States Patent [19]  
Takeuchi et al.

[11] Patent Number: 6,060,004  
[45] Date of Patent: *May 9, 2000

[54] PROCESS FOR PRODUCING BUMPER MADE OF SYNTHETIC RESIN FOR AUTOMOBILE VEHICLE

[75] Inventors: Atsushi Takeuchi; Minoru Makuta; Hitoshi Ohgane, all of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/744,986

[22] Filed: Nov. 7, 1996

[30] Foreign Application Priority Data

Nov. 9, 1995 [JP] Japan ................. 7-290849

[51] Int. Cl.[7] ............. B29C 45/16; B60R 19/03
[52] U.S. Cl. ........ 264/40.1; 264/255; 264/328.8; 425/130; 293/120
[58] Field of Search .............. 264/255, 328.8, 264/245, 45.1, 46.6, 40.1; 425/130; 293/120

[56] References Cited

U.S. PATENT DOCUMENTS 4,174,413 11/1979 Yasuike et al. .................. 428/35
5,059,361 10/1991 Da Re' ............................ 264/25
5,609,374 3/1997 Sawae et al. ................. 293/102

FOREIGN PATENT DOCUMENTS 2087299 5/1982 United Kingdom .

Primary Examiner—Jan H. Silbaugh  
Assistant Examiner—Suzanne E. Mason  
Attorney, Agent, or Firm—Nikaido Marmelstein Murray & Oram, LLP

[57] ABSTRACT

An outer layer forming material is injected into a cavity in a mold and then, a core forming material is injected, whereby the core forming material is allowed to flow into the outer layer forming material existing in the cavity, and both the materials are allowed to flow within the cavity. The cavity has a main area for forming a bumper main portion, and side areas for forming bumper sides. A relation, $d_1 > d_2$ is established between a distance $d_1$ determining a bumper thickness of a first section for forming an upper portion of the bumper main portion and a distance $d_2$ determining a bumper thickness of a second section for forming a lower portion of the bumper main portion. A relation, $d_3 > d_1$ is established between a distance $d_3$ determining a bumper thickness of the side areas and the distance $d_1$. A film gate opens into the first section. Thus, in the main area and the side areas, the times required for the filling of the outer layer forming material to be completed are substantially equal to each other.

2 Claims, 8 Drawing Sheets

PROCESS FOR PRODUCING BUMPER MADE OF SYNTHETIC RESIN FOR AUTOMOBILE VEHICLE

BACKGROUND OF THE INVENTION

1. Field of the Invention

The present invention relates to a process for producing a bumper made of a synthetic resin for an automobile vehicle, and particularly, to an improvement in a process for producing a bumper made of a synthetic resin for an automobile vehicle and having a sandwich structure comprised of a core and an outer layer covering the core, the process including a first step of injecting an outer layer forming material into a bumper forming cavity through a gate in a mold, and a second step of injecting a core forming material to allow the core forming material to flow into the outer layer forming material existing in the gate and the cavity and to allow the outer layer and core forming materials to flow within the cavity.

2. Description of the Related Art

In the prior art, such a bumper includes a bumper main portion extending laterally from a central portion of a vehicle body, and a pair of bumper sides connected to opposite ends of the bumper main portion, and has a substantially uniform thickness in its entirety.

Therefore, the cavity in the mold includes a main area for forming the bumper main portion, and a pair of side areas for forming the pair of bumper sides, and has a uniform distance in its entirety for compliance with the thickness of the bumper. The gate opens, for example, into a section of the cavity for forming an upper portion of the bumper main portion in the main area.

In such a producing process, while the outer layer forming material is flowing within the cavity, the core forming material is allowed to flow into the outer layer forming material. However, after the outer layer forming material is filled into the cavity to stop its flowing, it is difficult to allow the core forming material to further flow into the outer layer forming material.

If the distance of the cavity is set substantially constant under such a situation as in the prior art, the following problem is encountered: a large difference is produced between the time taken for the outer layer forming material injected into the cavity at the first step to be filled in the main area into which the gate opens, and the time taken for such outer layer forming material to be filled in each of the side areas spaced apart from the gate. Due to this, it is difficult to produce a bumper having a sandwich structure in its entirety.

SUMMARY OF THE INVENTION

Accordingly, it is an object of the present invention to provide a producing process of the above-described type, which is capable of producing a bumper of a synthetic resin having a sandwich structure in its entirety.

To achieve the above object, according to the present invention, there is provided a process for producing a bumper made of a synthetic resin for an automotive vehicle and having a sandwich structure comprised of a core and an outer layer covering the core, the process comprising: a first step of injecting an outer layer forming material into a bumper forming cavity through a gate in a metal mold, the bumper forming cavity including a main area for forming a bumper main portion extending laterally from a central portion of a vehicle body, and a pair of side areas for forming a pair of bumper sides continuously formed to opposite ends of the bumper main portion, the main area being comprised of a first section for forming an upper portion of the bumper main portion, and a second section for forming a lower portion of the bumper main portion, the metal mold having relations, $d_3 > d_1$ and $d_3 > d_2$ established between a distance $d_1$ determining the bumper thickness of the first section, a distance $d_2$ determining the bumper thickness of the second section and a distance $d_3$ determining the bumper thickness of each of the side areas, and the gate opening into the first section; and a second step of injecting a core forming material to allow the core forming material to flow into the outer layer forming material existing in the gate and the cavity and to allow the outer layer and core forming materials to flow to the cavity.

If the distances of the cavity are set and the gate is disposed in the above manner, the outer layer forming material injected into the cavity at the first step flows from the first section into the second section of the main area and also actively flows into the opposite side areas having a small resistance to the flowing.

Thus, the times taken for the filling of the outer layer forming material into the main area and the side areas to be completed are substantially equal to each other and moreover, such time can be shortened is hastened in each of the side areas. Before the completion of the filling of the outer layer forming material, the core forming material is allowed to flow into the flowing outer layer forming material, thereby producing a bumper having a sandwich structure in its entirety.

Thus, a bumper made of a synthetic resin for an automotive vehicle and having a sandwich structure and a good quality can be produced by using the mold specified in the above manner.

The above and other objects, features and advantages of the invention will become apparent from the following description of a preferred embodiment taken in conjunction with the accompanying drawings.

DETAILED DESCRIPTION OF THE PREFERRED EMBODIMENT

The present invention will now be described by way of preferred embodiments with reference to the accompanying drawings.

Figure 1:
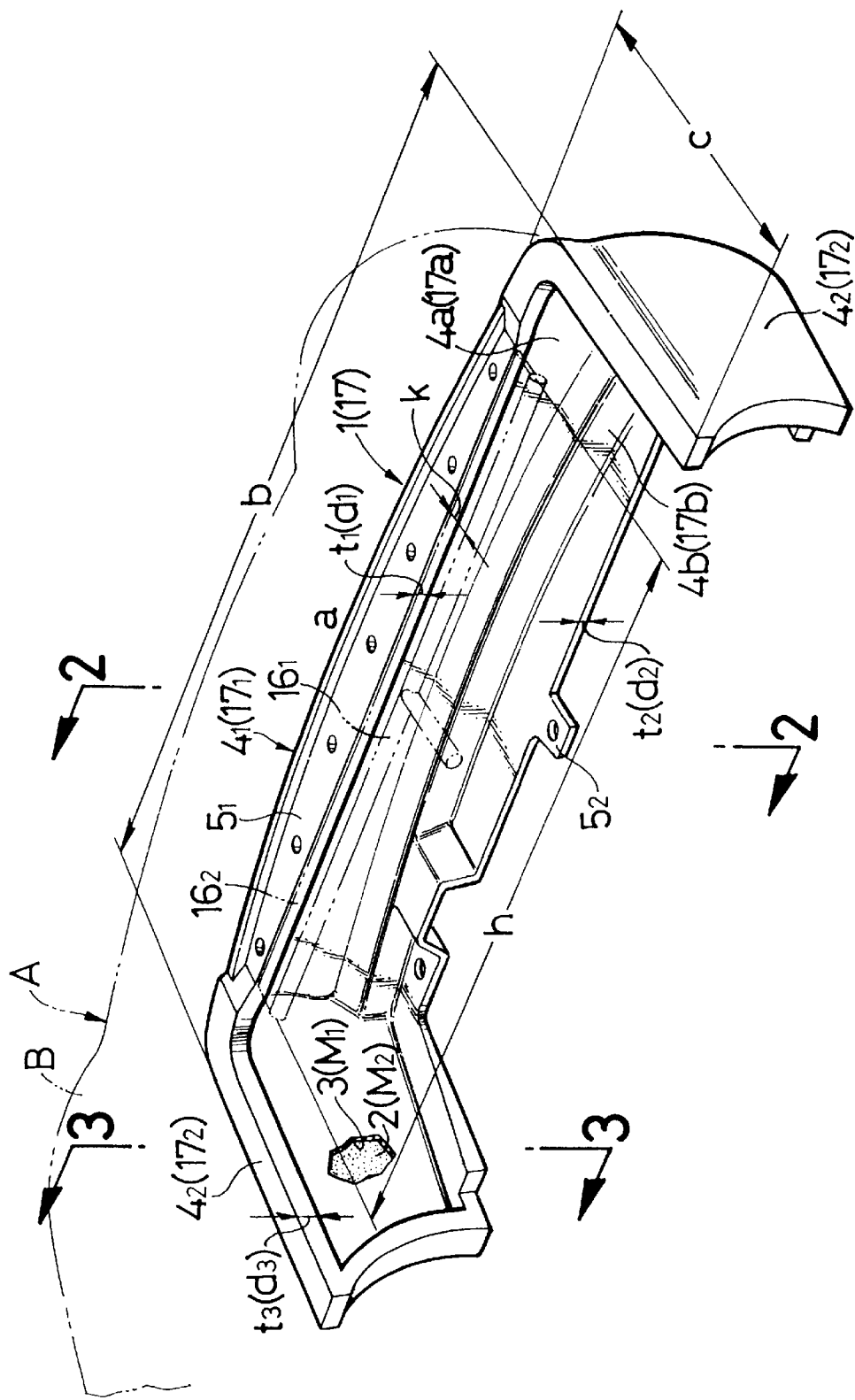
FIG. 1 is a perspective view of a bumper.

Referring to FIG. 1, a bumper 1 made of a synthetic resin having a sandwich structure is mounted to a front portion of a vehicle body B of an automotive vehicle A. The sandwich structure includes a core 2 and an outer layer covering the core 2, as shown in FIGS. 2 and 3.

The bumper includes a main bumper portion $4_1$ extending laterally from a central portion a of a vehicle body, and a pair of bumper side portions $4_2$ continuously formed to opposite ends of the bumper main portion $4_1$.

Figure 2:
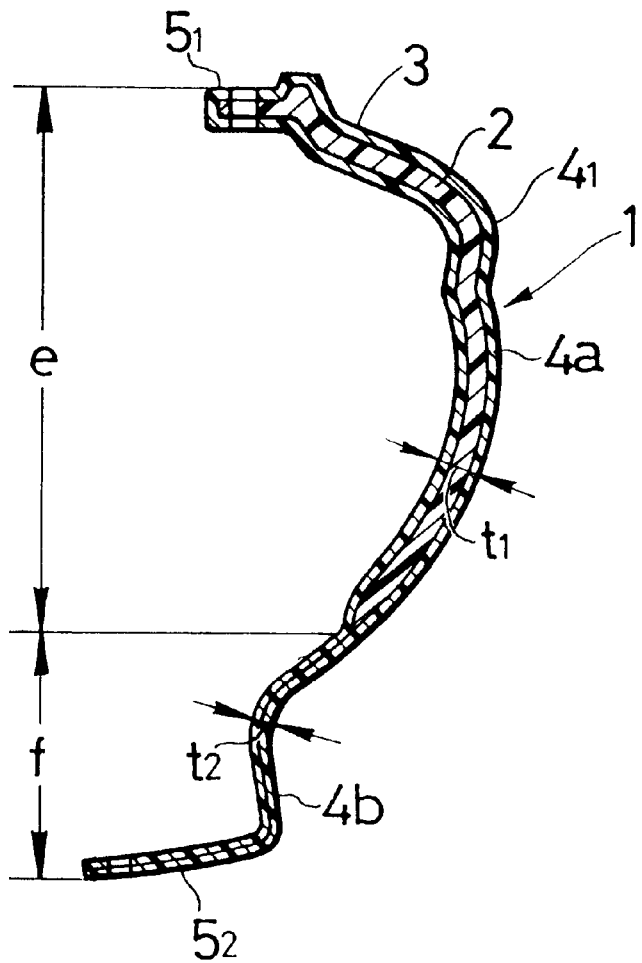
FIG. 2 is a sectional view taken along the line 2—2 in FIG. 1.
Figure 3:
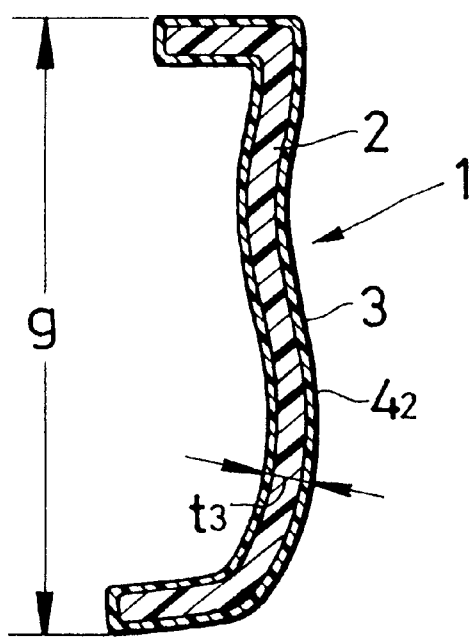
FIG. 3 is a sectional view taken along the line 3—3 in FIG. 1.

As best shown in FIGS. 1 and 2, the bumper main portion $4_1$ includes an upper portion 4a and a lower portion 4b. For the forming reason, the thickness $t_1$ of the upper portion 4a is larger than the thickness $t_2$ of the lower portion 4b ($t_1 > t_2$). Likewise, for the forming reason, the thickness $t_3$ of each bumper side portion $4_2$ is larger than the thickness $t_1$ of the upper portion 4a ($t_3 > t_1$).

If the bumper is constructed in the above manner, even if the main bumper portion $4_1$ includes the lower portion 4b having the smaller thickness, the rigidity of the bumper main portion $4_1$ can be insured, because it has upper and lower mounting portions $5_1$ and $5_2$ for mounting to the vehicle body B. On the other hand, the rigidity of each of the bumper side portions $4_2$ having no mounting portion for mounting to the vehicle body B is insured as a result of an increase in thickness thereof.

The core 2 is formed from a main material which is produced by pulverizing a recovered bumper formed using a polypropylene (PP) modified by an ethylene-propylene rubber (EPR) and having a thermoplastic synthetic resin coating on a surface. The outer layer 3 is formed from a main material which is a polypropylene modified by an ethylene-propylene rubber.

Figure 4:
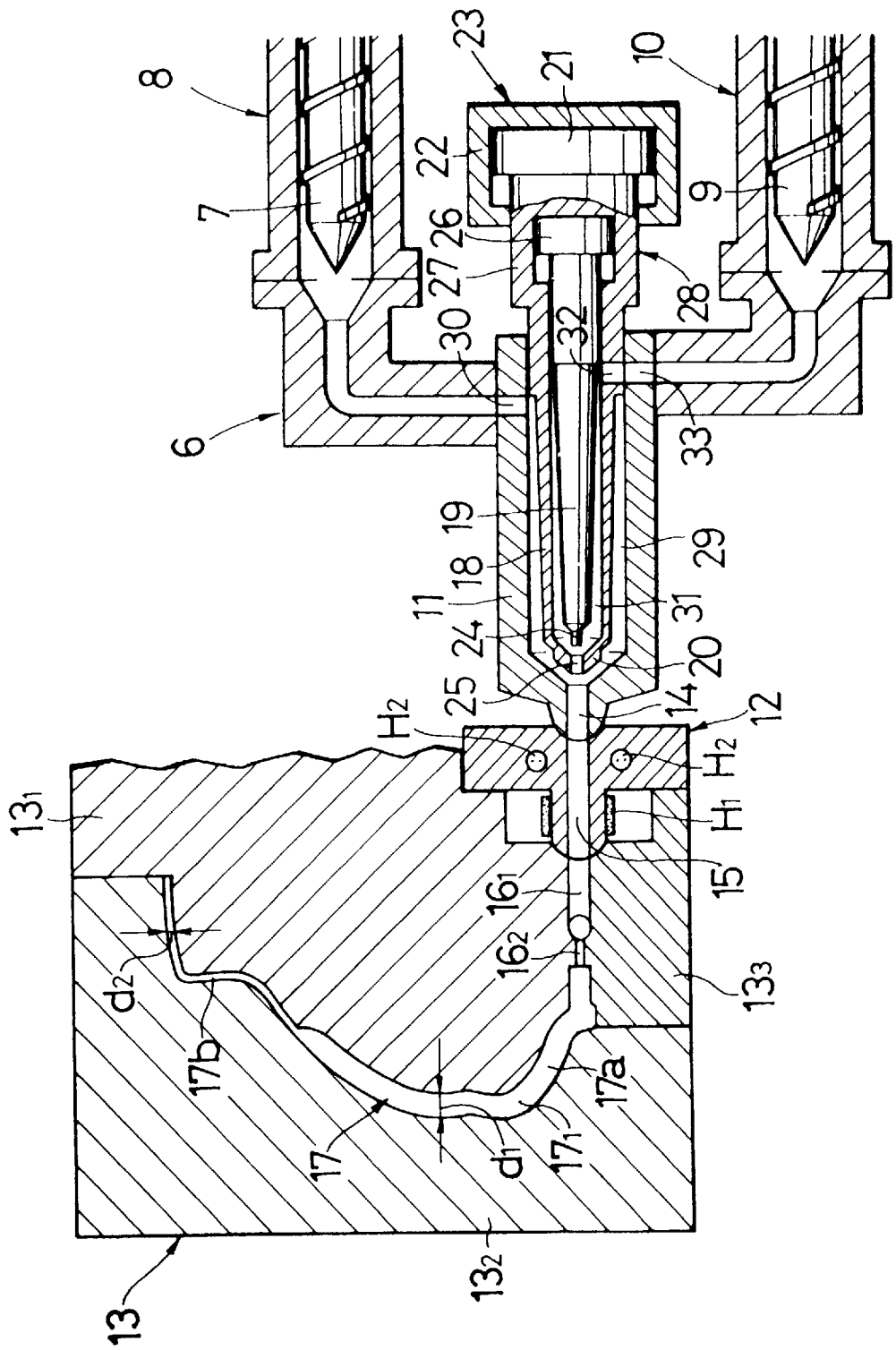
FIG. 4 is a vertical sectional view of an injection molding apparatus.
Figure 5:
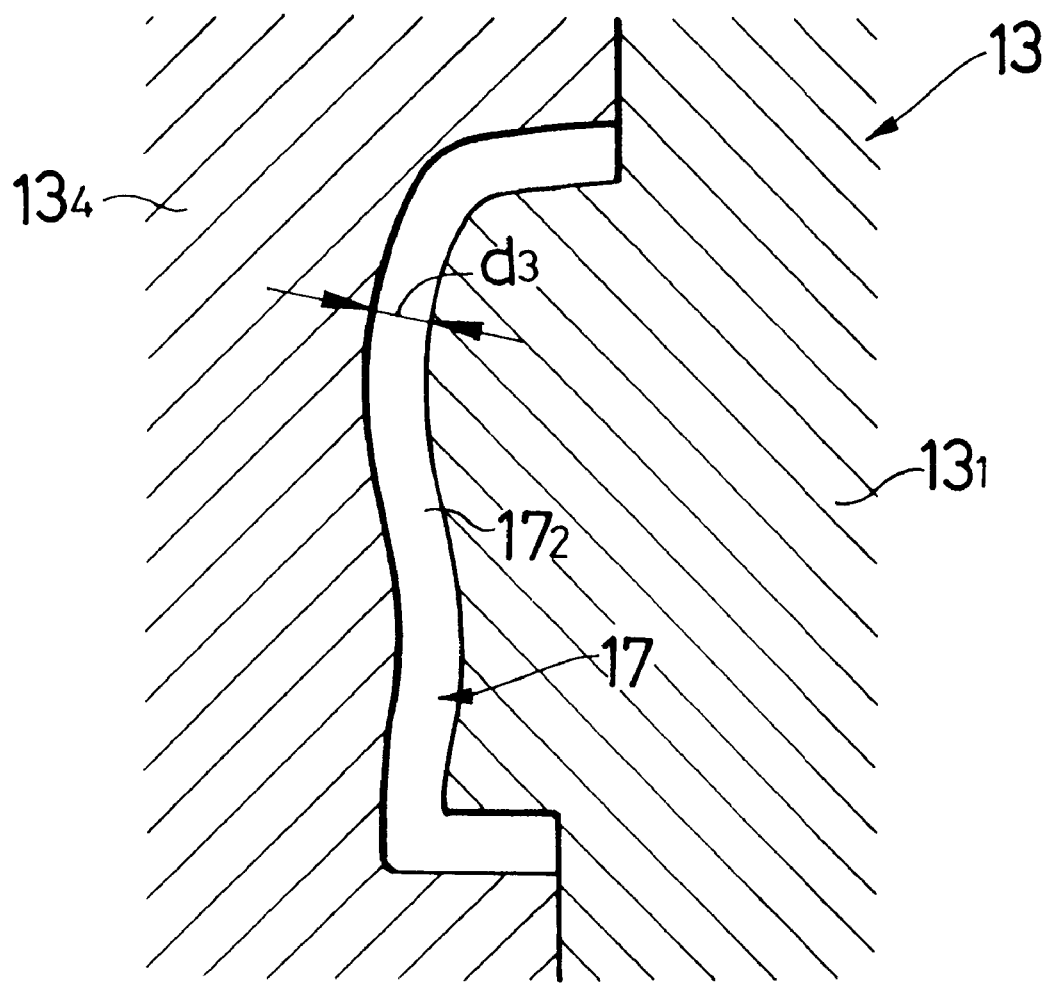
FIG. 5 is a vertical sectional view showing side areas of a cavity in a mold.

Referring to FIGS. 4 and 5, an injection molding apparatus 6 used for producing the bumper 1 includes a first injection unit 8 having a screw 7 to inject an outer layer forming material, a second injection unit 10 having a screw 9 to inject a core forming material, a nozzle 11 which connects both the injection units 8 and 10 to each other, a hot runner block 12 connected to the nozzle 11, and a split metal mold 13 detachably mounted to the hot runner block 12.

A supply passage 14 in the nozzle 11 communicates with a runner $16_1$ in the metal mold 13 through a hot runner 15, and a film gate (gate) $16_2$ extending from the runner $16_1$ communicates with a bumper forming cavity 17. $H_1$ is a band heater, and $H_2$ is a cartridge heater.

The metal mold 13 includes a stationary die $13_1$ on the hot runner block 12, and a plurality of movable dies $13_2$ to $13_4$ movable toward and away from the stationary die $13_1$. The cavity 17 in the metal mold 13 includes a main area $17_1$ for forming the main bumper portion $4_1$, and a pair of side areas $17_2$ for forming the pair of bumper side portions $4_2$.

The main area $17_1$ includes a first section 17a for forming the upper portion 4a of the main bumper portion $4_1$, and a second section 17b for forming the lower portion 4b of the main bumper portion $4_1$.

If a distance determining the bumper thickness $t_1$ of the first section 17a is represented by $d_1$, and a distance determining the bumper thickness $t_2$ of the second section 17b s represented by $d_2$, a relation, $d_1 > d_2$ is established. If a distance determining the bumper thickness $t_3$ of the side area $17_2$ is represented by $d_3$, a relation, $d_3 > d_1$ is established between the distance $d_3$ and the distance $d_1$ of the first section 17a. Therefore, $d_3 > d_1$ and $d_3 > d_2$.

The film gate $16_2$ opens into an end of the first section 17a of the main area $17_1$. In this case, as shown in FIG. 1, the runner $16_1$ extends over the laterally substantially entire length of the main bumper portion $4_1$, and the film gate $16_2$ has substantially the same length as the runner $16_1$.

A hollow outer needle 18 and a solid inner needle 19 are disposed concentrically within the nozzle 11. In the outer needle 18, a valve portion 20 at a tip end of the needle 18 is opposed to the supply passage 14, and a piston 21 is provided at a base end of the needle 18 and slidably received in a cylinder 22. The piston 21 and the cylinder 22 constitute a supply passage opening/closing mechanism 23. In the inner needle 19, a valve portion 24 at a tip end is opposed to a valve bore 25 formed in the valve portion 20 of the outer needle 18, and a piston 26 is provided at a base end and slidably received in a cylinder 27 formed at the base end of the outer needle 18. The piston 26 and the cylinder 27 constitute a valve bore opening/closing mechanism 28.

The outer needle 18 has a tapered outer peripheral surface connected to the valve portion 20, and an outer passage 29 is formed between the tapered outer peripheral surface and an inner peripheral surface of the nozzle 11. The outer passage 29 is adapted to communicate at one end thereof with the supply passage 14 and at the other end thereof with the first injection unit 8 through a through-hole 30 in the nozzle 11. The outer needle 18 has a straight outer peripheral surface at its base end, so that the through-hole 30 can be closed by such outer peripheral surface.

The inner needle 19 has a tapered outer peripheral surface connected to the valve portion 24 thereof, and an inner passage 31 is formed between such tapered outer peripheral surface and the inner peripheral surface of the outer needle 18. The inner passage 31 is adapted to communicate at one end thereof with the valve bore 25 and at the other end thereof with the second injection unit 10 through through-holes 32 and 33 in the outer needle 18 and the nozzle 11. The inner needle 19 has a straight outer peripheral surface at its base end, so that the through-hole 32 can be closed by such outer peripheral surface.

A specific example of the production of the bumper 3 using the injection molding apparatus 6 will be described below.

Referring to FIGS. 1 to 3, the dimensions of portions of the bumper 1 are as follows: on the basis of the vehicle body B, the lateral length b of the bumper main portion $4_1$=1700 mm; the longitudinal length c of each bumper side portion $4_2$=550 mm, the height e of the upper portion 4a=320 mm; the height f of the lower portion 4b=320 mm; the height g of each bumper side portion $4_2$=300 mm; the thickness $t_1$ of the upper portion 4a=4 mm; the thickness $t_2$ of the lower portion 4b=3 mm; the thickness $t_3$ of each bumper side portion $4_2$=5 mm.

The dimensions of portions of the cavity 17 are determined depending upon the shape of the bumper 1. In this case, the lateral length h of the gates $16_2$=1200 mm, and the longitudinal length k=2 mm.

A. Preparation of Core Forming Material

A recovered bumper molded using a polypropylene modified by an ethylene-propylene rubber and having a two-pack urethane coating on a surface thereof was selected. The composition of the recovered bumper is as follows:

| | |
|---|---|
| Polypropylene | 64% by weight |
| Ethylene-propylene rubber | 28% by weight |
| Talc | 7% by weight |
| Coating | 1% by weight |

The recovered bumper was thrown into a pulverizer and pulverized therein. Then, the pulverized material was thrown into and melted and kneaded in a granulator. The resulting molten/kneaded material was passed through a filter of 80 to 100 mesh, whereby large particles were removed. Thereafter, the molten/kneaded material was passed through a capillary having an inside diameter of 1 mm to form a linear material. The linear material was cut into a length of 1 to several mm to provide a pellet-like core forming material.

B. Preparation of Outer Layer Forming Material

A mixture including

| Polypropylene | 63% by weight |
|---|---|
| Ethylene-propylene rubber | 30% by weight |
| Talc | 7% by weight | to provide the same composition as the recovered bumper (however, the coating is excluded) was thrown into the granulator and subjected to the same procedure as in the above-described item A to produce a pellet-like outer later forming material.

C. Production of Bumper (i) In FIG. 4, the outer layer forming material was placed into the first injection unit 8 and maintained in a molten state of 210° C. The core forming material was placed into the second injection unit 10 and maintained in a molten state of 200° C. The preheating temperatures of the stationary die $13_1$ and the movable dies $13_2$ to $13_4$ are 40° C. and 50° C., respectively.

Figure 6:
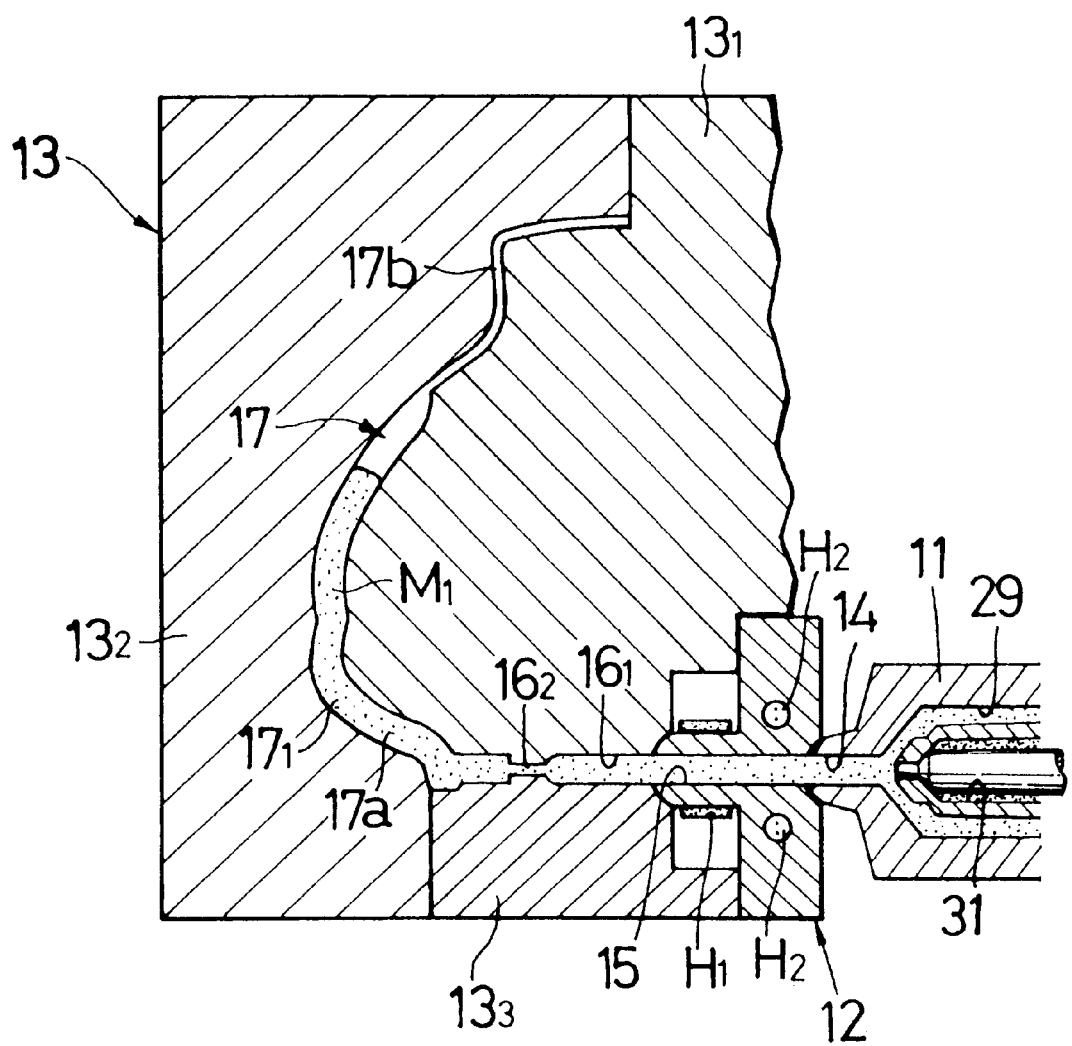
FIG. 6 is a view for explaining a first step.

(ii) At a first step, in a condition in which the outer passage 29 was in a connected state and the inner passage 31 was in a disconnected state, the outer layer forming material $M_1$ was injected into the bumper forming cavity 17 in the metal mold 13 through the supply passage 14, the hot runner 15, the runner $16_1$ and the film gate $16_2$ under operation of the first injection unit 8, as shown in FIG. 6.

Figure 7:
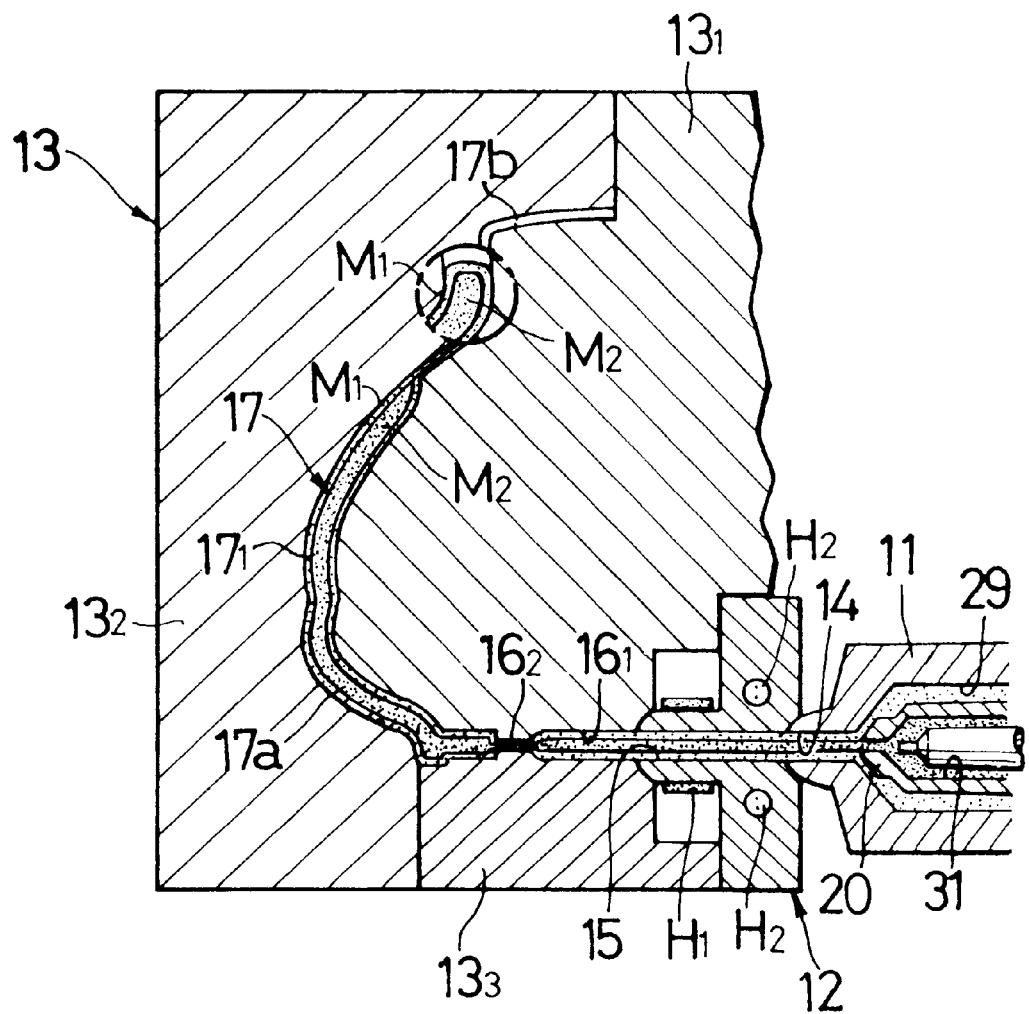
FIG. 7 is a view for explaining a second step.

(iii) At a second step, a portion of the outer passage 29 adjacent the supply passage 14 was throttled by the valve portion 20 under operation of the first injection unit 8, as shown in FIG. 7. In a condition in which the inner passage 31 was in a connected state, the core forming material $M_2$ was injected under operation of the second injection unit 10, whereby the core forming material $M_2$ was allowed to flow into the outer layer forming material $M_1$ within the supply passage 14, the hot runner 15, the runner $16_1$, the film gate $16_2$ and the cavity 17, and the outer layer and core forming materials $M_1$ and $M_2$ were allowed to flow within the cavity 17. Then, the operation of the second injection unit 10 was stopped.

Figure 8:
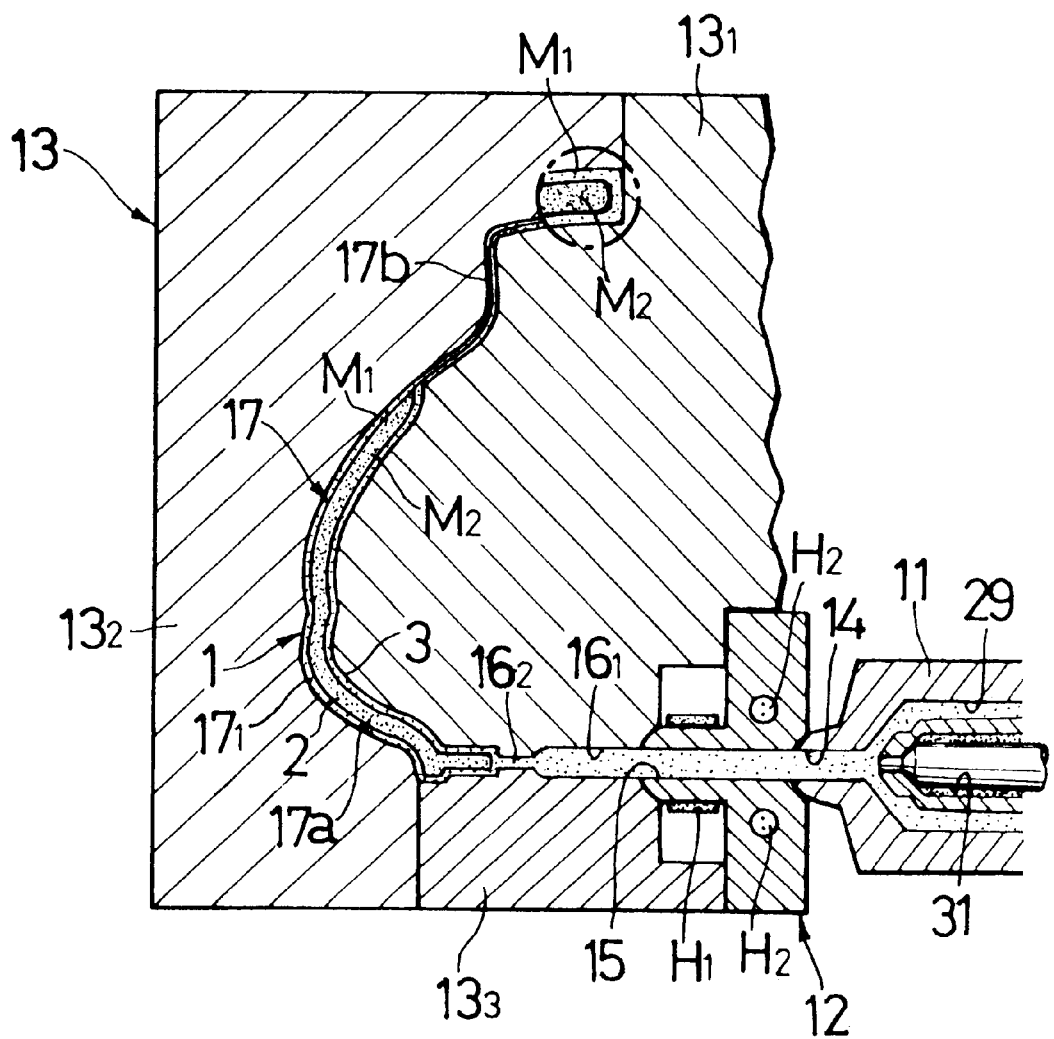
FIG. 8 is a view for explaining a third step.

(iv) At a third step, as shown in FIG. 8, in the condition in which the outer passage 29 was in the connected state and the inner passage 31 was in the disconnected state, the outer layer and core forming materials $M_1$ and $M_2$ of a double structure existing within the supply passage 14, the hot runner 15, the runner $16_1$ and the film gate $16_2$ were pushed into the cavity 17 by the outer layer forming material $M_1$ under operation of the first injection unit 8, thereby forming the core 4 and the outer layer 5. Then, the operation of the first injection unit 8 was stopped.

(v) The metal mold 13 was moved away from the hot runner block 12 and then, the mold opening was conducted to provide a bumper 1.

After the above-described producing process, the outer layer forming material $M_1$ is retained in a molten state within the hot runner 15 and hence, the molding of the bumper 3 can be carried out continuously.

Table 1 shows the injection time and the injection speed for the outer layer forming material $M_1$ and the core forming material $M_2$ relating to the first, second and third steps in the production of the bumper 1.

TABLE 1

| | | Outer layer forming material | | Core forming material | |
|---|---|---|---|---|---|
| | | Injection speed (mm/sec) | Injection time (sec) | Injection speed (mm/sec) | Injection time (sec) |
| First step | Va | 46.0 | 5.3 | — | — |
| | Vb | 24.7 | 0.24 | | |
| Second step | Vb | 24.7 | 1.78 | Ve 48.4 | 4.3 |
| | Vc | 15.1 | 1.79 | | |
| | Vd | 9.7 | 0.79 | | |
| Third step | Vd | 9.7 | 1.6 | — | — |

Figure 9:
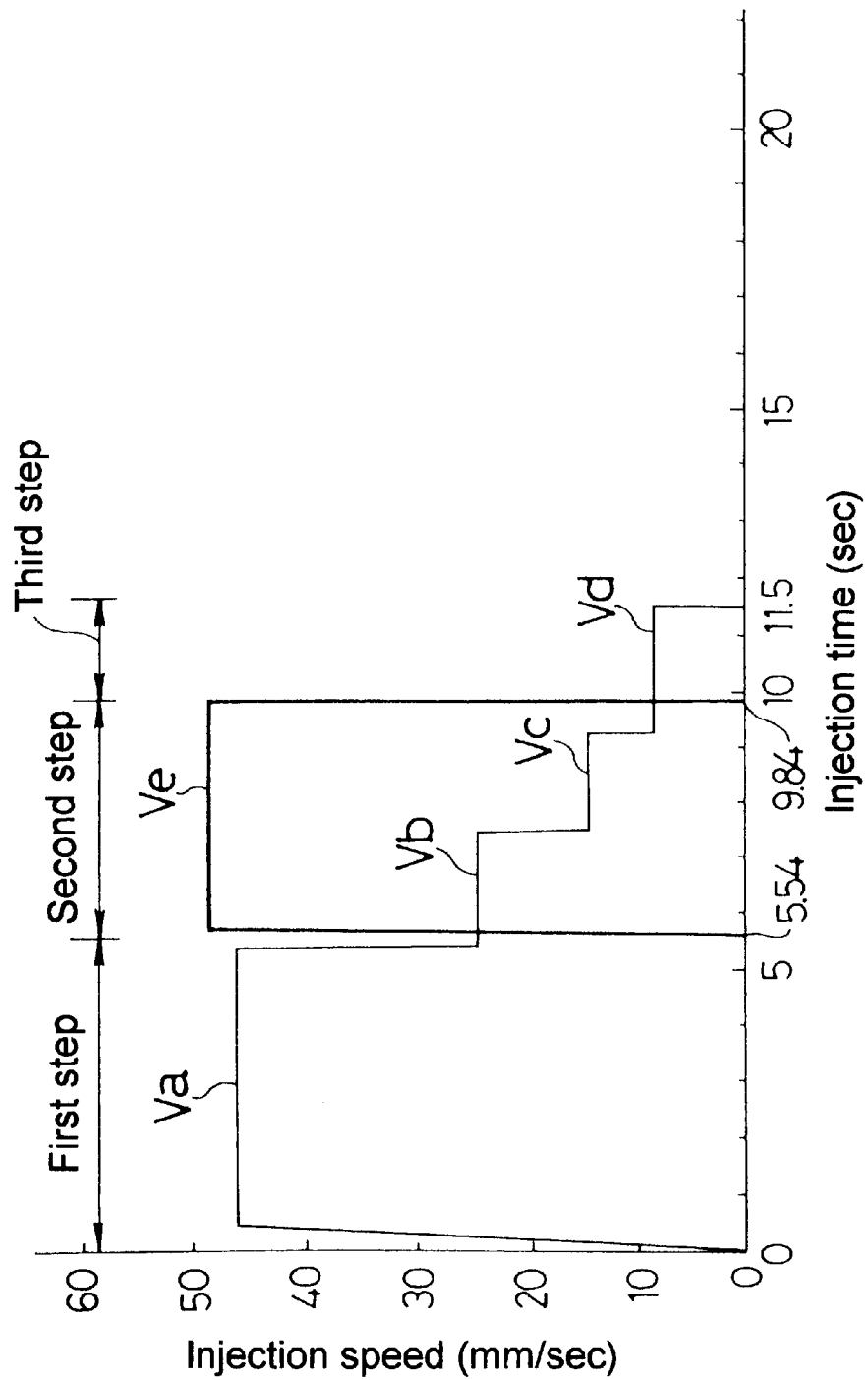
FIG. 9 is a graph illustrating the relationship between the injection time and the injection speed in an example of the present invention.

FIG. 9 is based on Table 1 and show the relationship between the injection time and the injection speed. In this case, the injection speed was controlled at two stages for the outer layer forming material $M_1$ at the first step; at one stage for the core forming material $M_2$ and at three stages for the outer layer forming material $M_1$ at the second step; and at one stage for the outer layer forming material $M_1$ at the third step.

In the metal mold 13, if the distances $d_1$, $d_2$ and $d_3$ in the cavity 17 and the film gate $16_2$ is disposed in the above manner, the outer layer forming material $M_1$ injected into the cavity 17 at the first step reaches the first section 17a of the main area $17_1$ in an early stage, because the distance $d_1$ of the first section 17a is relatively wide and near the film gate $16_2$, but because the distance $d_2$ of the filling of the outer layer forming material $M_1$ in the second section 17b is correspondingly retarded. This promotes the flowing of the outer layer forming material $M_1$ into both the side areas $17_2$ of a small resistance to the flowing.

On the other hand, in each of the side areas $17_2$, the flowing of the outer layer forming material $M_1$ into and within the side areas $17_2$ with the promotion of the flowing is activated, because of the relatively wide distance $d_3$ of the side areas $17_2$, and the filling of the outer layer forming material $M_1$ into each of the side areas $17_2$ is hastened, because the ends of the film gate $16_2$ are located in the vicinity of the side areas $17_2$.

Thus, the times taken for the filling of the outer layer forming material $M_1$ into the main area $17_1$ and into the side areas $17_2$ to be completed are substantially equal to each other, and moreover, such times in the side areas $17_2$ are shortened. Therefore, before completion of the filling of the outer layer forming material $M_1$, the core forming material $M_2$ can be allowed to sufficiently flow into the flowing outer layer forming material $M_1$ in the main area $17_1$ and the side areas $17_2$.

If the injection speed Ve of the core forming material $M_2$ at the second step is set higher than the injection speeds Va and Vb of the outer layer forming material $M_1$ at the first step, as shown in FIG. 9, a front portion of the core forming material in the flowing direction can be allowed to exist within the front portion of the outer layer forming material $M_1$ in the flowing direction at a time point when a front portion of the outer layer forming material $M_1$ in the flowing direction reaches near the terminal end of the second section 17b, as shown in FIG. 7. In this case, if the injection speeds Vb, Vc and Vd of the outer layer forming material $M_1$ are set lower than the highest injection speed Va at the first step, the difference between the injection speeds of the materials $M_1$ and $M_2$ can be increased, even if the injection speed Ve of the core forming material $M_2$ is less high.

If the injection speed Vd of the outer layer forming material $M_1$ at the third step is set at a value equal to or lower than the final injection speed Vc of the outer layer forming material $M_1$ at the second step, e.g., at Vd in the production of this bumper 1, the outer layer forming material $M_1$ cannot flow into the core forming material $M_2$ at the third step, whereby the film gate communication portion of the bumper 1 can be formed from only the outer layer forming material $M_1$.

In the above manner, the bumper 1 having the sandwich structure in its entirety could be produced. In this bumper 1, the filling rate of the core forming material $M_2$ prepared from the recovered bumper is high, which is effective for providing a reduction in producing cost of the bumper 1 and a resources saving.

For comparison, an attempt was made to produce a bumper 1 having thicknesses of portions set at 4 mm. The result made clear that the core forming material $M_2$ did not flow into the lower portion 4b of the bumper main portion $4_1$ and into the terminal ends of the bumper side portions $4_2$.

Table 2 shows the times taken for the front portion of the outer layer forming material $M_1$ in the flowing direction to reach the end walls of the portions of the cavity 17.

TABLE 2

|  | Cavity | |
| --- | --- | --- |
|  | Second section | Each side area |
| Embodiment | 8.3 sec | 8.6 sec |
| Comparative example | 7.3 sec | 10.6 sec |

As can be seen from Table 2, in the present embodiment, time periods required by the outer layer forming material $M_1$ to reach each of the end walls of the second section and each side area are close to each other, but in the comparative example, such time periods are largely different from each other.

In addition to the those described above, the outer layer forming material $M_1$ which may be used for the production of the bumper 1 includes the following examples:

Composition Example 1

| Polypropylene | 63% by weight |
| --- | --- |
| Ethylene-propylene rubber | 30% by weight |
| Talc | 7% by weight |
| Weather-resistant stabilizer | 1 phr |
| Ultraviolet light absorber | 1 phr |
| Carbon black (pigment) | 3 phr |
| Coatability enhancing modifier | 3 phr |

Composition Example 2

| Polypropylene | 60% by weight |
| --- | --- |
| Ethylene-propylene rubber | 30% by weight |
| Talc | 10% by weight |
| Weather-resistant stabilizer | 1 phr |
| Ultraviolet light absorber | 1 phr |
| Carbon black (pigment) | 3 phr |
| Coatability enhancing modified | 3 phr |

In addition to those described above, the core forming material $M_2$ which may be used for the production of the bumper 1 includes the following examples:

(1) A forming material consisting of 93% by weight of a combination of a polypropylene and 7% by weight of talc. In this case, the polypropylene contains 30% by weight of a ethylene-propylene based rubber simultaneously synthesized at a step of polymerization of the polypropylene. The talc was added to the polypropylene at a final step of the synthesis of the polypropylene. This forming material is more inexpensive than a forming material containing a polypropylene and an ethylene-propylene rubber separately produced and blended.

(2) A forming material containing the following components:

| Polypropylene | 60% by weight |
| --- | --- |
| Ethylene-propylene rubber | 30% by weight |
| Talc | 10% by weight |

What is claimed is:

1. A process for producing a bumper made of a synthetic resin for an automotive vehicle and having a sandwich structure comprised of a core and an outer layer covering said core, said process comprising:

a first step of injecting an outer layer forming material into a bumper forming cavity through a gate in a metal mold, said bumper forming cavity including a main area for forming a bumper portion extending laterally from a central portion of a vehicle body, and a pair of side areas for forming a pair of bumper sides continuously formed to opposite ends of said bumper main portion, said main area being comprised of a first section for forming an upper portion of said bumper main portion, and a second section for forming a lower portion of said bumper main portion, said metal mold having relations, $d_3 > d_1$ and $d_3 > d_2$ established between a distance $d_1$ determining a bumper thickness of said first section, a distance $d_2$ determining a bumper thickness of said second section and a distance $d_3$ determining a bumper thickness of each of said side arms. wherein the second section and the side areas have end walls, and said gate opening into said first section, wherein said relations between the distances $d_1$, $d_2$ and $d_3$ cause the time taken for the outer layer forming material to flow from said first section to said second section and to reach the end walls of said second section to be substantially equal to the times taken for the outer layer forming material to reach the end walls of the side areas of said cavity; and, before the outer layer forming material fills said cavity, a second step of injecting a core forming material to allow said core forming material to flow into said outer layer forming material existing in said gate and said cavity and to allow said outer layer and core forming materials to fill said cavity, thereby producing a bumper having a sandwich structure.

2. A process for producing a bumper made of a synthetic resin for an automotive vehicle according to claim 1, wherein a relation, $d_1 > d_2$ is established between said distance $d_1$ of the first section and said distance $d_2$ of the second section.

* * * * *